(12) United States Patent
Finnie et al.

(10) Patent No.: US 11,263,495 B2
(45) Date of Patent: Mar. 1, 2022

(54) DEVICE AND METHOD OF DIGITAL IMAGE CONTENT RECOGNITION, TRAINING OF THE SAME

(71) Applicant: Robert Bosch GmbH, Stuttgart (DE)

(72) Inventors: Nicole Ying Finnie, Renningen (DE); Benedikt Sebastian Staffler, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 16/880,339

(22) Filed: May 21, 2020

(65) Prior Publication Data
US 2020/0380293 A1 Dec. 3, 2020

(30) Foreign Application Priority Data

Jun. 3, 2019 (EP) .................................... 19177832

(51) Int. Cl.
| | | |
|---|---|---|
| *G06K 9/62* | (2006.01) | |
| *G06N 3/08* | (2006.01) | |
| *G06T 3/00* | (2006.01) | |
| *G06T 3/60* | (2006.01) | |

(52) U.S. Cl.
CPC ........... *G06K 9/627* (2013.01); *G06K 9/6228* (2013.01); *G06K 9/6256* (2013.01); *G06N 3/08* (2013.01); *G06T 3/0006* (2013.01); *G06T 3/60* (2013.01)

(58) Field of Classification Search
None
See application file for complete search history.

(56) References Cited

U.S. PATENT DOCUMENTS

| 10,963,754 B1* | 3/2021 | Ravichandran | .......... G06N 3/04 |
| 2019/0221121 A1* | 7/2019 | Guo | ......................... G08G 1/20 |
| 2020/0090028 A1* | 3/2020 | Huang | ................ G06K 9/6267 |

OTHER PUBLICATIONS

Wei-Yu Chen et al., "A Closer Look at Few-Shot Classification", ICLR, Cornell University, 2019, pp. 1-17.
Yu-Xiong Wang et al., "Learning to Model the Tail", 31st Conference on Neural Information Processing Systems (NIPS 2017), Long Beach, CA, US, 2017, pp. 1-11. https://papers.nips.cc/paper/7278-learning-to-model-the-tail.

(Continued)

*Primary Examiner* — Leon Flores
(74) *Attorney, Agent, or Firm* — Norton Rose Fulbright US LLP; Gerard Messina

(57) ABSTRACT

A device and computer implemented method for digital image content recognition. The method includes determining, depending on a digital image, a first candidate class for the content of the digital image by a baseline model neural network comprising a first feature extractor and a first classifier for classifying digital images; determining a second candidate class for the content of the digital image by a prototypical neural network comprising a second feature extractor and a second classifier for classifying digital images, classifying the content of the digital image into either the first candidate class or the second candidate class depending on the result of a comparison of a first confidence score for the first candidate class to a threshold or of a comparison of a first confidence score for the first candidate class to a second confidence score for the second candidate class.

14 Claims, 4 Drawing Sheets

(56) References Cited

OTHER PUBLICATIONS

Jake Snell et al., "Prototypical Networks for Few-Shot Learning", 31st Conference on Neural Information Processing Systems (NIPS 2017), Long Beach, CA, USA, 2017, pp. 1-13. http://www.cs.toronto.edu/~zemel/documents/prototypical_networks_nips 2017.
Zhao, et al., "Few-shot and Many-Shot Fusion Learning in Mobile Visual Food Recognition," 2019 IEEE International Symposium on Circuits and Systems, IEEE, May 26, 2019, 5 pages, XP033574321.

\* cited by examiner

DEVICE AND METHOD OF DIGITAL IMAGE CONTENT RECOGNITION, TRAINING OF THE SAME

CROSS REFERENCE

The present application claims the benefit under 35 U.S.C. § 119 of European Patent Application EP 19177832.3 filed on Jun. 3, 2019, which is expressly incorporated herein by reference in its entirety.

FIELD

The present invention relates to a device and method of digital image content recognition, and a device and method of training the same.

BACKGROUND INFORMATION

Artificial neural networks can be trained for digital image content recognition. Usually a feature extractor extracts features of a digital image and a classifier determines a class for the content of the digital image from a plurality of predetermined classes depending on the extracted features. In order to produce useful recognition, the artificial neural network is trained with training data. Good results are achievable when training data that is used for training the artificial neural network comprises many digital images in each class. When the training data is imbalanced in the sense that the training data comprises very few digital images in some classes while other classes have many digital images, the training of the artificial neural network is less effective. Consequently, it is difficult to provide a good digital image pattern recognition mechanism from such imbalanced training data. It is hence desirable to provide digital image content recognition for a large number of extremely imbalanced classes in an efficient way.

SUMMARY

It is desirable to provide digital image content recognition for a large number of extremely imbalanced classes in an efficient way. This may be achieved by the devices and methods according to the present invention.

In one example embodiment in accordance with the present invention, a computer implemented method of digital image content recognition comprises determining depending on a digital image a first candidate class for the content of the digital image by a baseline model neural network comprising a first feature extractor and a first classifier for classifying digital images; determining a second candidate class for the content of the digital image by a prototypical neural network comprising a second feature extractor and a second classifier for classifying digital images, classifying the content of the digital image into either the first candidate class or the second candidate class depending on the result of a comparison of a first confidence score for the first candidate class to a threshold or of a comparison of a first confidence score for the first candidate class to a second confidence score for the second candidate class. This is an end to end model for a large number of extremely imbalanced classes in an efficient way.

Advantageously the example method comprises applying one or more transformations to the digital image, in particular cropping, mirroring, rotating, smoothing, or contrast reduction, to create a modified digital image, determining the first candidate class and/or the second candidate class for the modified digital image, determining an average of a numerical representation of the candidate classes for the digital image and the modified digital image, determining the class for the content of the digital image depending on the average. Transformation is meant to make the model more robust, when the model is trained with "partial" information or "distorted information" of train images but can still learn the right classification. In another aspect, in transformation, both train and test images are normalized to reduce the intra-variance in an image. For example, an RGB image with the pixel value between 0~255 will be normalized in the range of 0~1, so it makes neural networks faster to learn.

In accordance with an example embodiment of the present invention, a computer implemented method of training an artificial neural network for image content recognition comprises collecting a first set of digital images from a database comprising digital images assigned to many shot classes and digital images assigned to few shot classes, wherein the first set of digital images is sampled in particular only from digital images assigned to a many shot class; creating a first training set comprising the collected first set of digital images; training in a first stage a first artificial neural network comprising a first feature extractor and a first classifier for classifying digital images using the first training set; collecting first parameters of the trained first feature extractor, determining in a second stage second parameters of a second feature extractor of a second artificial neural network comprising the second feature extractor and a second classifier for classifying digital images depending on the first parameters. A baseline model is trained with the classes, which contain the most training images. The baseline model is for example trained with a cosine norm distance based classifier. The digital images of the remaining classes are not used for training in the first stage. Since the baseline model is unable to learn good features from a large number of classes, a prototypical neural network, i.e., a protonet, uses the baseline model parameters in its feature extractor and calculates a centroid for digital images of classes of the remaining classes. This provides an end to end model for a large number of extremely imbalanced classes in an efficient way.

Advantageously for the first digital images in each multi shot class the same amount of digital images is sampled. This mans the training images are sampled equally from each multi shot class. So the learned features won't favor the classes that have more training images. This baseline model learns the features of the base classes.

Advantageously each multi shot class comprises of more digital images than each few shot class.

Advantageously the method comprises training the second feature extractor with the second set of training data. The second feature extractor is pretrained, i.e., contains the parameters from the trained baseline model. The second feature extractor is fine tuned using the second classifier. The protonet samples training images from the low shot classes and calculates the centroid of each low shot class as support. The protonet samples validation images as query from each of the low shot classes to calculate another centroid and to maximize the distance between the two centroids. This means the protonet pushes the centroids away from each other using the n-way x-support y-query approach, where n is the number of classes, x is the number of training images per class, y is the number of validation images per class. At the same time, the prototypical neural network minimizes the distance between the images in the same class and the centroids during training.

Advantageously the method comprises using the second classifier with the second feature extractor having fixed second parameters.

Advantageously the first classifier is a cosine norm distance based classifier and/or the second classifier is a second cosine norm distance based classifier or a euclidean norm distance based classifier. The first feature extractor is trained using a cosine norm distance as distance based classifier. The second feature extractor is either using a cosine norm distance or a euclidean norm distance as distance based classifier. For example either the first classifier and the second classifier are distance based classifiers or the first classifier and the second classifier are similarity based classifiers, in particular either the first classifier is a first cosine norm distance-based classifier and the second classifier is a second cosine norm classifier, or the first classifier is a first Euclidean norm classifier and the second classifier is a second Euclidean norm distance-based classifier, or the first classifier is a first cosine similarity based classifier and the second classifier is a second cosine similarity based classifier.

Advantageously digital images assigned to a class are sampled for the first set of digital images if the number of digital images assigned to the class exceeds a first threshold, wherein the digital images assigned to the class are sampled for the second set of digital images if the number of digital images assigned to the class exceeds a second threshold, and in that digital images assigned to the class are neither sampled for the first set of digital images nor for the second set of digital images, if the number of digital images assigned to the class is equal to or below the first threshold and the second threshold. This means images are sampled based on a number of images per class in the database, wherein digital images in classes having less than a minimum number of digital images assigned thereto are excluded from the first set of digital images and the second set of digital images.

Advantageously the example method comprises applying one or more transformations to a digital image, in particular cropping, mirroring, rotating, smoothing, or contrast reduction to create a modified digital image, wherein the digital image is a digital image assigned to the multi shot class and the modified digital image is for the first training set, or wherein the digital image is a digital image assigned to the low shot class and the modified digital image is for the second training set.

In accordance with an example embodiment of the present invention, an example device for image content recognition comprises a processor and a memory for an artificial neural network, that are configured for image content recognition according to the method described above.

In one aspect of the present invention, an example device for processing digital images comprises a baseline model neural network device comprising a first feature extractor unit and a first classifier unit for classifying digital images adapted to determine depending on a digital image a first candidate class for the content of the digital image; a prototypical neural network device comprising a second feature extractor unit and a second classifier unit for classifying digital images adapted to determine a second candidate class for the content of the digital image, an aggregation device adapted to classify the content of the digital image into either the first candidate class or the second candidate class depending on the result of a comparison of a first confidence score for the first candidate class to a threshold or of a comparison of a first confidence score for the first candidate class to a second confidence score for the second candidate class.

The example device advantageously comprises a digital image transformation device, adapted to apply one or more transformations to the digital image, in particular cropping, mirroring, rotating, smoothing, or contrast reduction, to create a modified digital image, determining the first candidate class and/or the second candidate class for the modified digital image, wherein the aggregation device is adapted to determine an average of a numerical representation of the candidate classes for the digital image and the modified digital image, determining the class for the content of the digital image depending on the average.

The example device advantageously comprises an input for providing a digital image captured from a digital image sensor and an output adapted to output a class of a content of the digital image for controlling a motion or an operating state of a vehicle, a robot, a machine in response to the digital image depending on the class of the content. The sensor may be a digital image sensor such as a LiDAR-, Radar-, Sonar-device or a camera. The control of the motion or operating state may refer to controlling an actuator, e.g. for avoiding an obstacle or for moving towards a target. The image content may be used in this context for deciding if the digital image is relevant for this motion or for determining control signals for actuating. The motion control of such devices is thus improved significantly.

Further advantageous embodiments may be derived from the description below and the figures.

DETAILED DESCRIPTION OF EXAMPLE EMBODIMENTS

Figure 1:
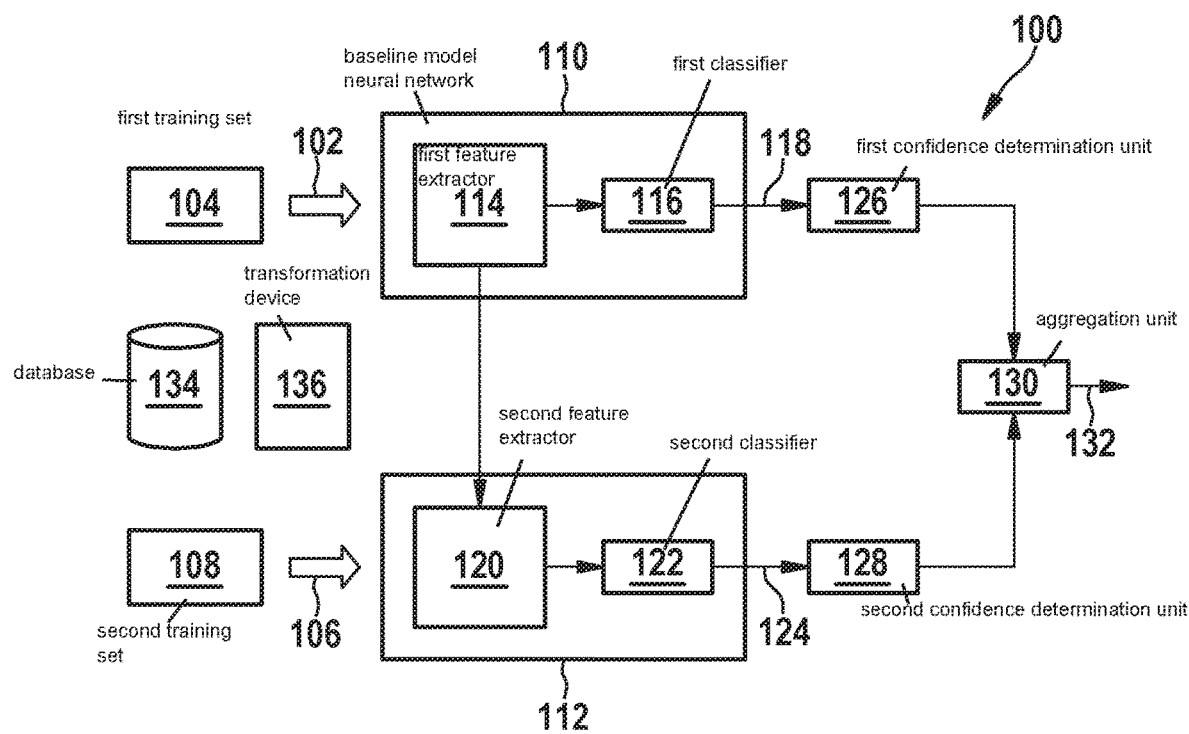
FIG. 1 shows a schematic view of an example device for image content recognition in accordance with the present invention.

FIG. 1 shows a device 100 for digital image content recognition. The device 100 comprises a first input 102 for a first training set 104. The device 100 comprises a second input 106 for a second training set 108.

The device 100 comprises a baseline model neural network 110 adapted to receive digital images from the first input 102. The device 100 comprises a prototypical model neural network 112 adapted to receive digital images from the second input 106.

The baseline model neural network 110 comprises a first feature extractor 114 and a first classifier 116. The first feature extractor 114 may be a deep neural network, e.g. comprising multiple convolutional layers, a ResNet, or an AlexNet. The first classifier 116 is for example a cosine distance classifier. The first feature extractor 114 is configured to determine features of a content of the digital image received at the input 102 in a feature space. The first classifier 116 is configured to classify the content of the digital image into a first candidate class. The first classifier 116 is configured to output the first candidate class at an output 122.

The prototypical model neural network 112 comprises a second feature extractor 120 and a second classifier 122. The second feature extractor 120 is configured according to the configuration of the first feature extractor 114. The second classifier 122 is for example a euclidean distance classifier. A cosine distance classifier may be used instead as well. The second feature extractor 120 is configured to determine features of a content of the digital image received at the input 106 in a feature space. The second classifier 122 is configured to classify the content of the digital image into a second candidate class. The second classifier 122 is configured to output the second candidate class at an output 124.

The device 100 comprises a first confidence determination unit 126, configured to determine a first confidence score of the first candidate class output at the output 118 by the first classifier 116.

The device 100 comprises a second confidence determination unit 128, configured to determine a second confidence score of the candidate class output at the output 124 by the second classifier 122.

The device 100 comprises an aggregation unit 130, configured to determine the class for the content of the digital image depending on the first candidate class or the second candidate class. In one aspect the aggregation unit 130 is configured to classify the content of the digital image either into the first candidate class or the second candidate class depending on the result of a comparison of the first confidence score to a threshold. In another aspect, the aggregation unit 130 is configured to classify the content of the digital image either into the first candidate class or the second candidate class depending on a comparison of the first confidence score to the second confidence score. The aggregation unit 130 is configured to output the class the content was classified into at an output 132.

The device 100 may contain a transformation device 136 adapted for applying one or more transformations to the digital image, in particular cropping, mirroring, rotating, smoothing, or contrast reduction, to create a modified digital image. The modified digital image may be received as part of the first training set 104 and/or the second training set 108 instead.

When a modified digital image is received, the device 100 is adapted for determining the first candidate class and/or the second candidate class for the modified digital image. The aggregation unit 130 is adapted in this case for determining an average of a numerical representation of the candidate classes for the digital image and the modified digital image and for determining the class for the content of the digital image depending on the average.

The device 100 comprises or is connectable to a database 134 for digital images. The database 134 comprises first digital images assigned to M many shot classes. The database 134 comprises second digital images assigned to F few shot classes. The database 134 in this case comprises N=M+F classes for the digital images. The database 134 may comprise U classes of digital images that are not used for training. The database 134 in this case comprises N=M+F+U classes for the digital images.

The baseline neural network 110 in the example is configured to determine M outputs that correspond to the M many shot classes.

The prototypical neural network 112 in one aspect is configured to determine M outputs that correspond to the M many shot classes as well. Preferably, the prototypical neural network 112 is adapted to output M+F outputs that correspond to the M Many shot classes classes and the F few shot classes respectively. In one aspect the prototypical neural network 112 may have an output for one or more of the U classes of digital images that were not used for training.

The first feature extractor 114 may be adapted to determine a first score $f1(x)$ for a digital image x. The first classifier 116 is adapted to classify the digital image into the first candidate class depending on the first score $f1(x)$. The second feature extractor 120 may be adapted to determine a second score $f2(x)$ for a digital image x. The second classifier 122 is adapted to classify the digital image into the second candidate class depending on the second score $f2(x)$.

In one aspect of the present invention depicted in FIG. 1, the device 100 for processing digital images comprises a baseline model neural network device 110 comprising a first feature extractor unit 114 and a first classifier unit 116 for classifying digital images adapted to determine depending on a digital image a first candidate class for the content of the digital image; a prototypical neural network device 112 comprising a second feature extractor unit 120 and a second classifier unit 122 for classifying digital images adapted to determine a second candidate class for the content of the digital image, an aggregation device 130 adapted to classify the content of the digital image into either the first candidate class or the second candidate class depending on the result of a comparison of a first confidence score for the first candidate class to a threshold or of a comparison of a first confidence score for the first candidate class to a second confidence score for the second candidate class.

The device 100 may comprise the digital image transformation device 136, adapted to apply one or more transformations to the digital image, in particular cropping, mirroring, rotating, smoothing, or contrast reduction, to create a modified digital image, determining the first candidate class and/or the second candidate class for the modified digital image. In this aspect the aggregation device 130 is adapted to determine an average of a numerical representation of the candidate classes for the digital image and the modified digital image, determining the class for the content of the digital image depending on the average.

The device 100 may contain an input 134 for providing a digital image captured from a digital image sensor and an output 132 adapted to output a class of a content of the digital image for controlling a motion or an operating state of a vehicle, a robot, a machine in response to the digital image depending on the class of the content. The sensor in one example is a LiDAR-, Radar-, Sonar-device or a camera. The class for the digital image content is in the example used in one aspect for deciding if the digital image is relevant. In another aspect, the class for the digital image content is used for determining a target or a control signal for this motion or for actuating. The control of the motion or operating state may refer to controlling an actuator, e.g., for avoiding an obstacle or for moving towards the target.

Figure 2:
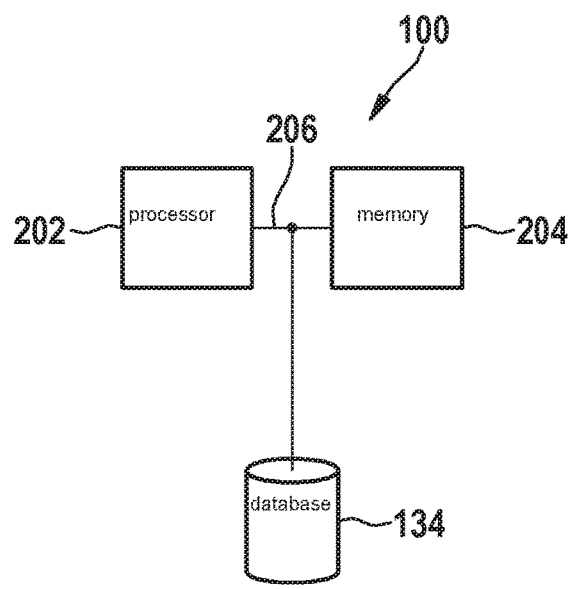
FIG. 2 shows parts of the example device.
Figure 3:
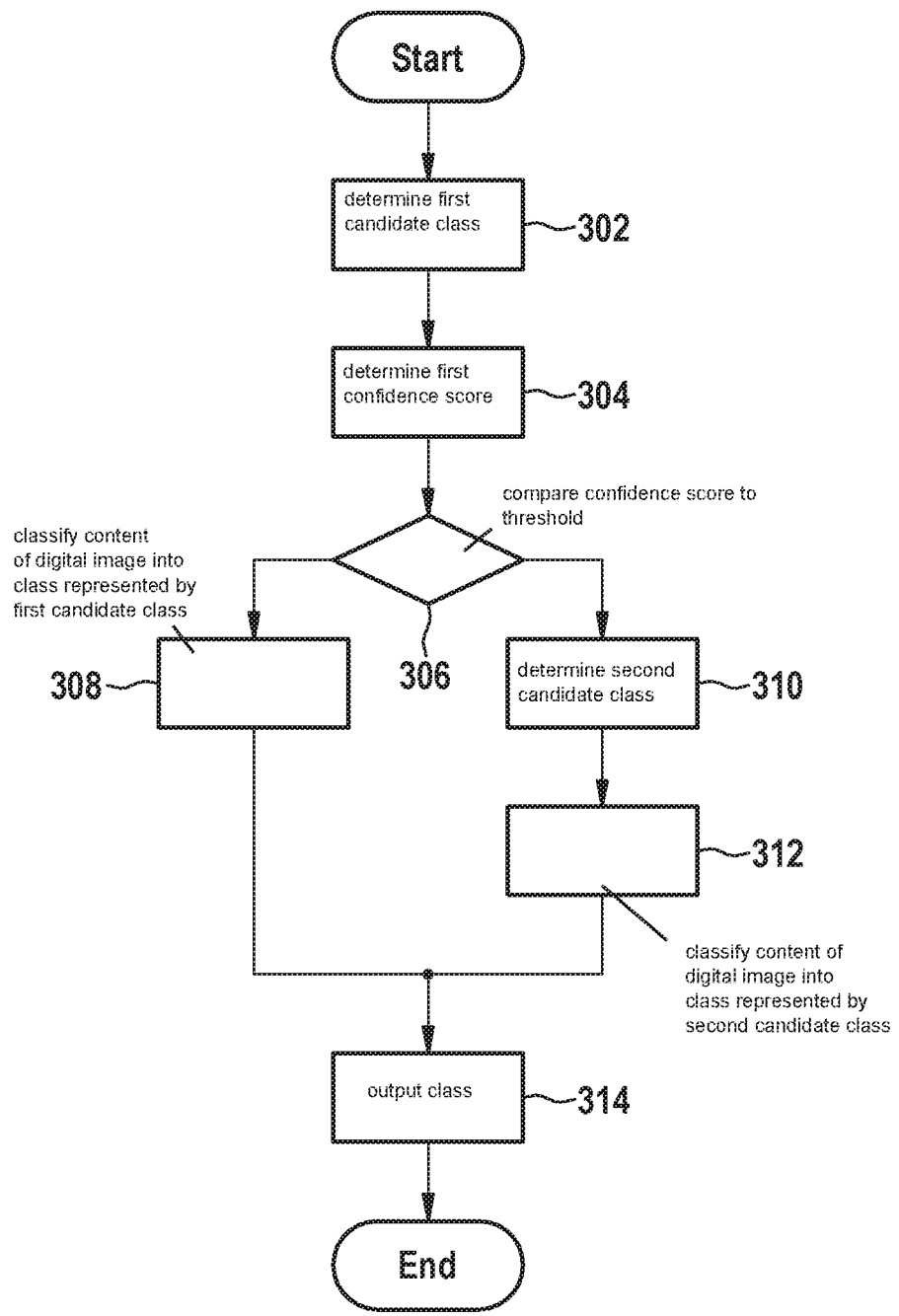
FIG. 3 show first aspects of an example digital image content recognition method in accordance with the present invention.
Figure 4:
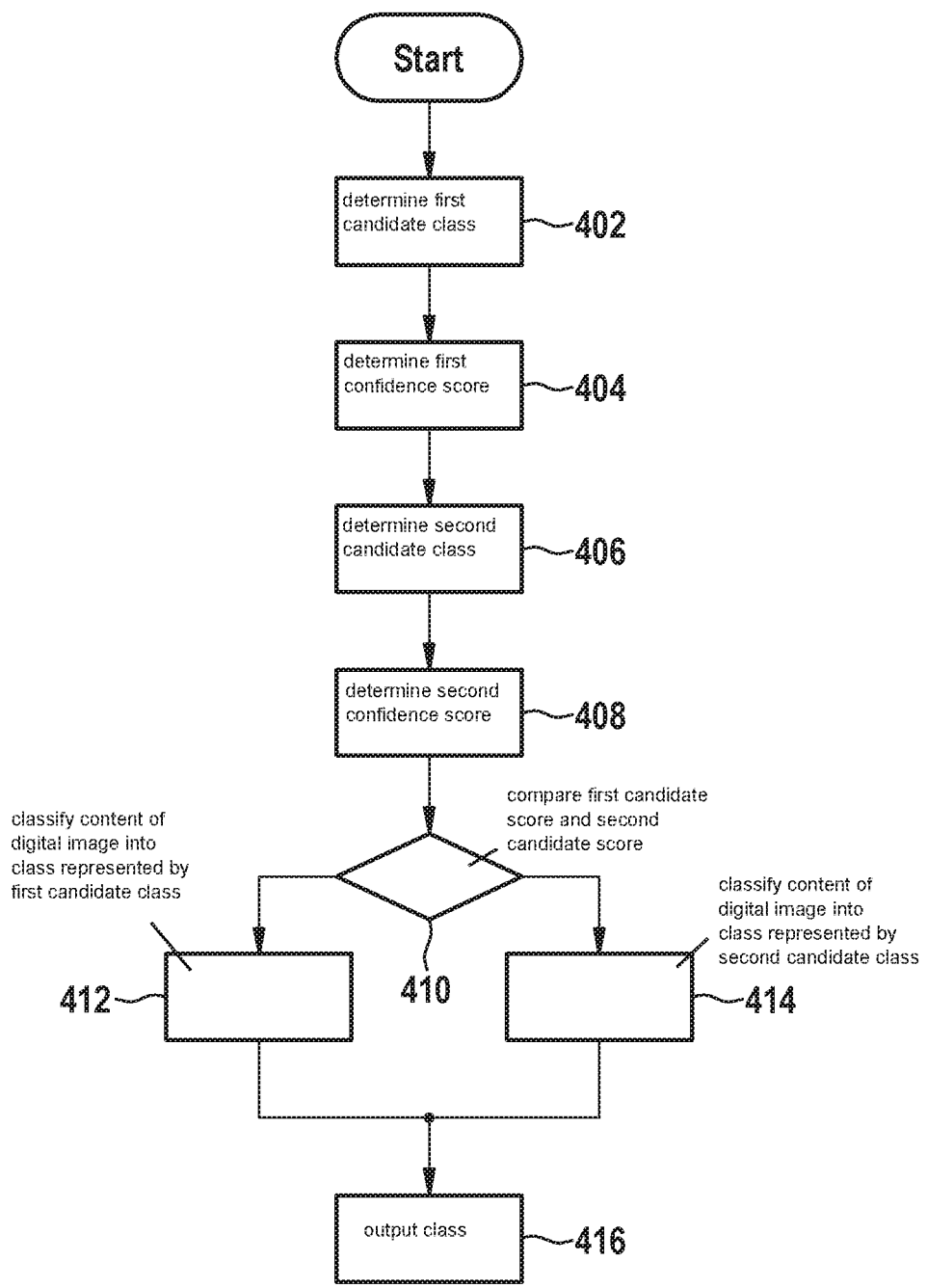
FIG. 4 shows second aspects of the example digital image content recognition method.
Figure 5:
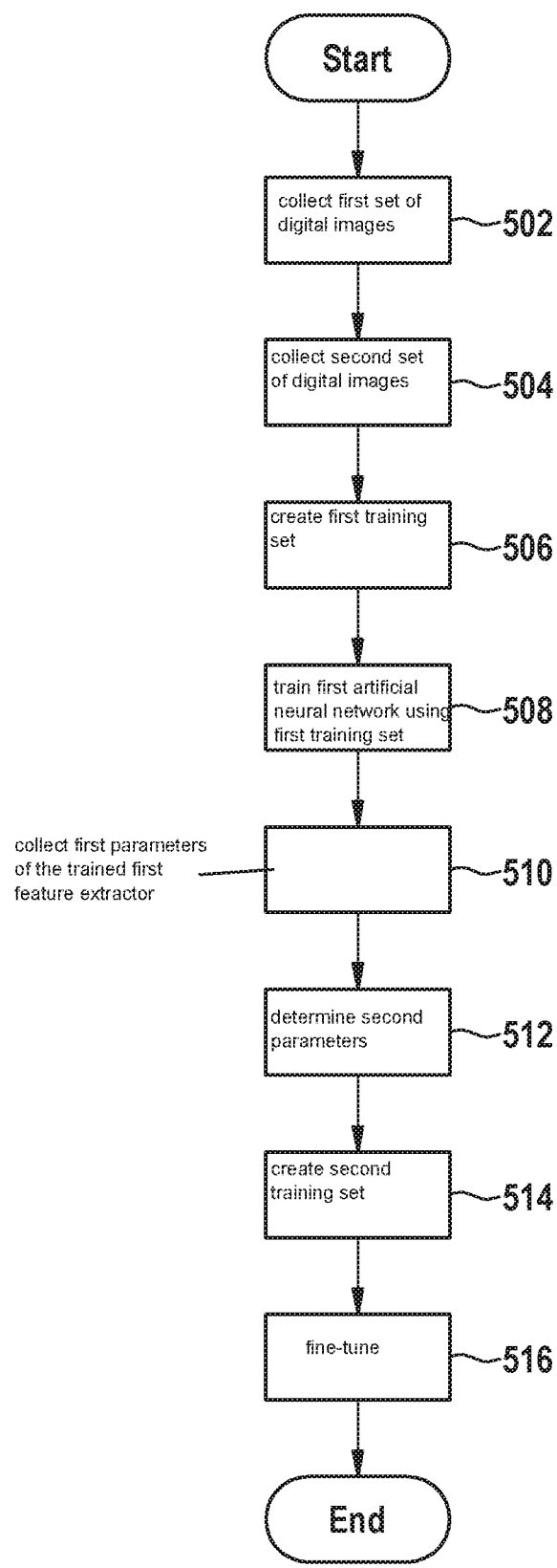
FIG. 5 shows steps in an example training method for digital image content recognition in accordance with the present invention.

In one aspect of the present invention depicted in FIG. 2, the device 100 comprises a processor 202 and a in particular computer readable non-volatile memory 204 that are configured for image content recognition according to the method describe below. The processor 202 and the memory 204 interact via a data line 206. The device 100 may connect to or comprise the database 134 connected via the data line 206. The processor may be a distributed computing system, a microprocessor or a microcontroller. Graphical processing units may be used as processors as well.

The parameters defining the baseline model neural network and the prototypical neural network may be stored in the memory 204 and are determined as described below. The trained baseline model neural network and the trained prototypical neural network may be stored in the memory 204 and are used as described next.

The memory 204 in the example comprises computer readable instructions for a computer implemented method of digital image content recognition. The memory 204 in the example comprises computer readable instructions for a computer implemented method of training the aforementioned neural networks.

According to one aspect of the present invention, when the computer implemented method of digital image content recognition starts, a step 302 is executed.

In the step 302 a first candidate class for the content of the digital image is determined depending on a digital image by the baseline model neural network 110 comprising the first feature extractor 114 and the first classifier 116 for classifying digital images. The first candidate class is for example represented by the highest numerical value of the M outputs of the baseline model neural network 110.

Afterwards a step 304 is executed.

In the step 304, the first confidence score is determined. The first confidence score is for example a numeric value between 0 and 1. The first confidence score is for example the highest numerical value of the M outputs of the baseline model neural network 110 normalized by the sum of all numerical values of all of the M outputs of the baseline model neural network 110.

Afterwards a step 306 is executed.

In step 306 in a comparison the first confidence score is compared with a threshold. If the first confidence score exceeds the threshold, a step 308 is executed. Otherwise, a step 310 is executed.

In Step 308 the content of the digital image is classified into the class represented by the first candidate class.

Afterwards a step 314 is executed.

In step 314 the class is output. Afterwards the method ends.

In step 310, a second candidate class for the content of the digital image is determined by the prototypical neural network 112 comprising the second feature extractor 120 and the second classifier 122 for classifying digital images. The second candidate class is in one aspect represented by the highest numerical value of the M outputs of the prototypical model neural network 112. The second candidate class is in another aspect represented by the highest numerical value of the M+F outputs of the prototypical model neural network 112. The second candidate class is in yet another aspect represented by the highest numerical value of the M+F+U outputs of the prototypical model neural network 112.

Afterwards a step 312 is executed.

In the step 312 the content of the digital image is classified into the second candidate class.

Then the step 314 is executed.

According to another aspect of the present invention, when the computer implemented method of digital image content recognition starts, a step 402 is executed.

In the step 402 a first candidate class for the content of the digital image is determined depending on a digital image by the baseline model neural network 110 comprising the first feature extractor 114 and the first classifier 116 for classifying digital images. The first candidate class is for example represented by the highest numerical value of the M outputs of the baseline model neural network 110.

Afterwards a step 404 is executed.

In the step 404, the first confidence score is determined. The first confidence score is for example a numeric value between 0 and 1. The first confidence score is for example the highest numerical value of the M outputs of the baseline model neural network 110 normalized by the sum of all numerical values of all of the M outputs of the baseline model neural network 110.

When calculating the confidence score, the score is for example normalized over M classes assuming that there are M+F classes. Thus, the confidence score can be pulled closer to a similar range as that of the confidence score of the baseline model, which is trained over M classes.

E.g., when the baseline has 1000 M classes, the confidence score ranges from 0.001 to 1.0, where the sum of confidence scores of all M classes=1.

The prototypical neural network e.g. has 10000 classes (1000 baseline M+9000 F classes) if we normalize the confidence score over only 1000 classes, the range of the confidence score can get closer to 0.001 to 1.0, otherwise the confidence score might be too low (from 0.0001 to 1) to compare with the baseline, harder to merge, where the sum of confidence scores of all M+F classes or M+F+U classes=1.

Different ways to normalize the scores may be used as well, e.g. by changing the scaling factor of the score in the prototypical neural network when the prototypes are being calculated. If we set a bigger scaling factor, the confidence score will get larger too.

Assuming that the predictions of prototypical neural network might be more wrong than the baseline model's predictions since there are more classes and only a few images per class are sampled in the prototypical neural network, not as well trained as the baseline model, it's fine to have a weaker confidence score. This makes ensembling easier too, as the strongest prediction wins. So the prototypical neural network prediction confidence score has to be literally absolutely higher than the baseline model's to be able to be taken as a prediction in the final result.

Afterwards a step 406 is executed.

In step 406, a second candidate class for the content of the digital image is determined by the prototypical neural network 112 comprising the second feature extractor 120 and the second classifier 122 for classifying digital images. The second candidate class is in one aspect represented by the highest numerical value of the M outputs of the prototypical model neural network 112. The second candidate class is in another aspect represented by the highest numerical value of the M+F outputs of the prototypical model neural network 112. The second candidate class is in yet another aspect represented by the highest numerical value of the M+F+U outputs of the prototypical model neural network 112.

Afterwards a step 408 is executed.

In the step 408, the second confidence score is determined. The second confidence score is for example a numeric value between 0 and 1. The second confidence score is for example the highest numerical value of the outputs of the prototypical model neural network 112 normalized by the sum of all numerical values of all of the outputs of the prototypical model neural network 112.

Afterward a step 410 is executed.

In step 410 in a comparison the first confidence score is compared with the second confidence score. If the first confidence score exceeds the second confidence score, a step 412 is executed. Otherwise, a step 414 is executed.

In Step 412 the content of the digital image is classified into the class represented by the first candidate class.

Afterwards a step 416 is executed.

In step 416 the class is output. Afterwards the method ends.

In the step 414 the content of the digital image is classified into the second candidate class.

Then the step 416 is executed.

The methods described above may comprise the following additional steps.

Applying one or more transformations to the digital image, in particular cropping, mirroring, rotating, smoothing, or contrast reduction, to create a modified digital image Determining the first candidate class and/or the second candidate class for the modified digital image according to one of the methods described above.

Determining an average of a numerical representation of the candidate classes for the digital image and the modified digital image Determining the class for the content of the digital image depending on the average.

The numerical representation of the candidate classes in the example preferably corresponds to the output of the baseline model neural network 110 and the prototypical neural network 112 respectively.

The class is determined by the comparison of the first confidence score and the threshold or the second confidence score depending on which of the methods is applied.

Exemplary details of the multi shot and the few shot classification as well as the baseline model neural network and the prototypical neural network are described, for example, in the following references:

"A CLOSER LOOK AT FEW-SHOT CLASSIFICATION", Wei-Yu Chen et al., ICLR 2019, available at https://openreview.net/pdf?id=HkxLXnAcFQ "Learning to Model the Tail", Yu-Xiong Wang et al., 31st Conference on Neural Information Processing Systems (NIPS 2017), Long Beach, Calif., US, available at https://papers.nips.cc/paper/7278-learning-to-model-the-tail.pdf.

"Prototypical Networks for Few-shot Learning", Jake Snell et al., 31st Conference on Neural Information Processing Systems (NIPS 2017), Long Beach, Calif., USA, available at http://www.cs.toronto.edu/~zemel/documents/prototypical_networks_nips_2017.pdf.

In contrast to the approaches described therein, the computer implemented training method described below has the following advantage:

The training of the feature extractor works for a large set of target classes. This is in particular achieved by using a cosine norm distance classifier in the baseline model neural network 110, by training the first feature extractor 114 and by using first parameters of the first feature extractor 114 as second parameters of the second feature extractor 120 in the prototypical neural network for the few shot learning model. This approach works for a large number of classes, e.g. 200000 classes. In practice, a similarity classifier with a range between −1 and 1, where 1 is output if the features of two images are identical, and −1 is output if both feature vectors are in the opposite directions, achieves a higher accuracy than a cosine distance classifier having a range between 0 and 2. Both perform very similarly and way better than a softmax classifier.

The digital images are sampled evenly from each class in each episode (epoch). Digital images are randomly drawn from many shot classes and few shot classes are oversampled. Oversampled in this context refers to augmenting the training data by creating modified digital images e.g. by the aforementioned transformation for digital images assigned to the few shot classes. For example, classes having more than 50 digital images per class assigned thereto are considered many shot classes. The other digital images are augmented so that e.g. 10 digital images are available for each class in the training set. There may be few shot classes having only a single digital image or very view digital images assigned thereto. These classes may be ignored. Training with this type of training data reduces training time by many orders of magnitude.

It is not required to have at least two images per class to train. This is particular useful when many one-shot classes, e.g., 18000 classes, have only one shot, i.e. only one digital image. The baseline model neural network 110 comprises the first feature extractor 114. The first feature extractor 114 is trained with the images of the many-shot classes and the first parameters of the first feature extractor 114 may be used in the second feature extractor 120 of the prototypical neural network 112. These second parameters may be used, e.g., as part of or starting point for the second feature extractor 120, without training the one-shot classes. Those one-shot class images may be used as support images during inference, i.e., when the aggregation predicts the class from candidate classes. To classify, a distance between the test images features and the one-shot train image features, i.e., support image features, is calculated. The distance is used to see how similar or close these images are to determine if they belong to the same class. Therefore, no additional training is required.

A main advantage is being able to learn features from a large long-tail imbalanced data set in a very efficient way. This approach is more robust to unseen images as well. The prototypical neural network can perform predictions on unseen classes, and the baseline model neural network performs well on open data, which comes from a different distribution than the train images. This approach is very efficient to achieve a good result. This approach reduces the total training time dramatically.

In one aspect publicly available pretrained weights on ImageNet may be used, to train, e.g., on 1000 digital image content classes with evenly distributed 1.2 million digital images. The model is for example retrained by evenly drawing from 1.5 million digital images only images from the first 10000 classes having the most digital images assigned thereto. Any other number of classes may be used, as long as it is beneficial for training. With this training, a well-trained feature space is available from the first feature extractor 114. The first parameters of the trained first feature extractor 114 are then used to determine the second parameters of the second feature extractor of the prototypical neural network to perform inference on test images and train images regardless of how many open classes are out there. This reduces the training time significantly.

When an epoch in a corresponding computer implemented method of training for image content recognition starts a step 502 is executed.

In step, 502 a first set of digital images is collected from the database 134 comprising digital images assigned to many shot classes and digital images assigned to few shot classes. In an example, each multi shot class comprises more digital images than each few shot class. The first set of digital images is sampled from digital images assigned to a many shot class. In particular, only digital images assigned to a many shot class are sampled. For the first digital images in each multi shot class the same amount of digital images may be sampled.

Afterwards a step 504 is executed.

In step 504 a second set of digital images is collected from the database 134. The second set of digital images is sampled from digital images assigned to a few shot class. In particular, only digital images assigned to a few shot class are sampled.

Afterwards a step 506 is executed.

In step 506, a first training set comprising the collected first set of digital images is created.

Afterwards a step 508 is executed.

In step 508 in a first stage a first artificial neural network comprising a first feature extractor and a first classifier 116 for classifying digital images using the first training set is trained. The first artificial neural network in the example is the baseline neural network 110.

Afterwards a step 510 is executed.

In step, 510 first parameters of the trained first feature extractor are collected.

Afterwards a step 512 is executed.

In step 512 in a second stage second parameters of a second feature extractor of a second artificial neural network comprising the second feature extractor and a second classifier for classifying digital images are determined depending on the first parameters. In the example, the second artificial neural network is the prototypical neural network.

Afterwards a step 514 is executed.

In step 514 a second training set for the second stage of training comprising the second set of digital images is created.

Afterwards a step 516 is executed.

In step 516 in the second stage the second feature extractor 120 is fine-tuned with the second set of training data. The second classifier is configured to determine the distance between training image features and test image features.

Afterwards the training epoch ends.

The training method ends when all digital images of all epochs have been used. The sampling steps described above may be performed at the beginning once for all epochs instead.

The first classifier 116 is a cosine norm distance based classifier The second classifier 122 is a second cosine norm distance based classifier or a euclidean norm distance based classifier.

In one aspect, digital images assigned to a class are sampled for the first set of digital images if the number of digital images assigned to the class exceeds a first threshold. In one aspect, the digital images assigned to this class are sampled for the second set of digital images if the number of digital images assigned to the class exceeds a second threshold. In yet another aspect digital images assigned to this class are neither sampled for the first set of digital images nor for the second set of digital images, if the number of digital images assigned to the class is equal to or below the first threshold and the second threshold. The first threshold is for example 50, the second threshold is for example 2.

In a further aspect, the data may be augmented by applying one or more transformations to a digital image. A modified digital image may be created from the digital image sampled for one of the first training set or the second training set in particular by cropping, mirroring, rotating, smoothing, or contrast reduction to create the modified digital image.

In the example, when the digital image is a digital image assigned to the multi shot class the modified digital image is also assigned for the first training set.

Likewise, when the digital image is a digital image assigned to the low shot class, the modified digital image is assigned to the second training set.

In accordance with an example embodiment of the present invention, a computer implemented method of digital image content recognition, may comprise of training a model by determining a trained baseline model neural network 110 and a trained prototypical neural network 112 and then use the trained baseline model neural network 110 and the trained prototypical neural network 112 for classifying a digital image.

What is claimed is:

1. A computer implemented method of digital image content recognition, the method comprising the following steps: determining, depending on a digital image, a first candidate class for content of the digital image, by a baseline model neural network, the baseline model neural network including a first feature extractor and a first classifier for classifying digital images; determining a second candidate class for the content of the digital image by a prototypical neural network, the prototypical neural network including a second feature extractor and a second classifier for classifying digital images; and classifying the content of the digital image into either the first candidate class or the second candidate class depending on the result of a comparison of a first confidence score for the first candidate class to a threshold or of a comparison of a first confidence score for the first candidate class to a second confidence score for the second candidate class;

and wherein the method further comprises the following steps: applying one or more transformations to the digital image to create a modified digital image, the one or more transformations including cropping and/or mirroring and/or rotating and/or smoothing and/or contrast reduction; determining the first candidate class and/or the second candidate class for the modified digital image; determining an average of a numerical representation of the first and second candidate classes for the digital image and the modified digital image; and determining a class for the content of the digital image depending on the average;

and wherein the one or more transformations are to make the baseline model neural network and/or the prototypical neural network more robust when the baseline model neural network and/or the prototypical neural network is trained with partial information or distorted information of training images.

2. A computer implemented method of training an artificial neural network for image content recognition, the method comprising the following steps: collecting a first set of digital images from a database, the database including digital images assigned to many shot classes and digital images assigned to few shot classes, wherein the first set of digital images is sampled from the digital images assigned to a many shot class; creating a first training set including the collected first set of digital images; training, in a first stage, a first artificial neural network, the first artificial neural network including a first feature extractor and a first classifier for classifying digital images using the first training set; collecting first parameters of the first feature extractor of the trained first artificial neural network; and determining, in a second stage, second parameters of a second feature extractor of a second artificial neural network, the second artificial neural network including the second feature extractor and a second classifier for classifying digital images depending on the first parameters; wherein, digital images assigned to a class are sampled for the first set of digital images when the number of digital images assigned to the class exceeds a first threshold, wherein the digital images assigned to the class are sampled fora second set of digital images when the number of digital images assigned to the class exceeds a second threshold, and wherein digital images assigned to the class are neither sampled for the first set of digital images nor for the second set of digital images, when the number of digital images assigned to the class is equal to or below the first threshold and the second threshold.

3. The method according to claim 2, wherein, for the first digital images in each multi shot class, the same amount of digital images is sampled.

4. The method according to claim 2, wherein each multi shot class includes more digital images than each few shot class.

5. The method according to claim 2, further comprising the following step:
training the second feature extractor with a second set of training data.

6. The method according to claim 2, further comprising: using the second classifier with the second feature extractor having fixed second parameters.

7. The method according to claim 2, wherein the first classifier is a cosine norm distance based classifier and/or the second classifier is a second cosine norm distance based classifier or a euclidean norm distance based classifier.

8. The method according to claim 2, further comprising the following step:
applying one or more transformations to a digital image to create a modified digital image, the one or more transformations including: cropping, and/or mirroring, and/or rotating, and/or smoothing, and/or contrast reduction;
wherein: (i) the digital image is a digital image assigned to the multi shot class and the modified digital image is for the first training set, or (ii) the digital image is a digital image assigned to the low shot class and the modified digital image is for the second training set.

9. A computer implemented method, the method comprising the following steps: collecting a first set of digital images from a database, the database including digital images assigned to many shot classes and digital images assigned to few shot classes, wherein the first set of digital images is sampled from the digital images assigned to a many shot class; creating a first training set including the collected first set of digital images; training, in a first stage, a baseline model neural network, the baseline model neural network including a first feature extractor and a first classifier for classifying digital images using the first training set; collecting first parameters of the first feature extractor of the trained baseline model neural network; and determining, in a second stage, second parameters of a second feature extractor of a prototypical neural network, the prototypical neural network including the second feature extractor and a second classifier for classifying digital images depending on the first parameters; determining, depending on a digital image, a first candidate class for content of the digital image, by the trained baseline model neural network; determining a second candidate class for the content of the digital image by the trained prototypical neural network; and classifying the content of the digital image into either the first candidate class or the second candidate class depending on the result of a comparison of a first confidence score for the first candidate class to a threshold or of a comparison of a first confidence score for the first candidate class to a second confidence score for the second candidate class;
wherein, digital images assigned to a class are sampled for the first set of digital images when the number of digital images assigned to the class exceeds a first threshold, wherein the digital images assigned to the class are sampled for a second set of digital images when the number of digital images assigned to the class exceeds a second threshold, and wherein digital images assigned to the class are neither sampled for the first set of digital images nor for the second set of digital images, when the number of digital images assigned to the class is equal to or below the first threshold and the second threshold.

10. A device for image content recognition, the device comprising: a processor and a memory that are configured for image content recognition; wherein the device is configured to: determine, depending on a digital image, a first candidate class for content of the digital image, by a baseline model neural network, the baseline model neural network including a first feature extractor and a first classifier for classifying digital images; determine a second candidate class for the content of the digital image by a prototypical neural network, the prototypical neural network including a second feature extractor and a second classifier for classifying digital images; and classify the content of the digital image into either the first candidate class or the second candidate class depending on the result of a comparison of a first confidence score for the first candidate class to a threshold or of a comparison of a first confidence score for the first candidate class to a second confidence score for the second candidate class; and wherein the device is further configured to: apply one or more transformations to the digital image to create a modified digital image, the one or more transformations including cropping and/or mirroring and/or rotating and/or smoothing and/or contrast reduction; determine the first candidate class and/or the second candidate class for the modified digital image; determine an average of a numerical representation of the first and second candidate classes for the digital image and the modified digital image; and determine a class for the content of the digital image depending on the average; and wherein the one or more transformations are to make the baseline model neural network and/or the prototypical neural network more robust when the baseline model neural network and/or the prototypical neural network is trained with partial information or distorted information of training images.

11. The device according to claim 10, further comprising:
an input for providing the digital image, the digital image being captured from a digital image sensor; and
an output adapted to output the class of the content of the digital image for controlling a motion or an operating state of a vehicle, or a robot, or a machine, in response to the digital image depending on the class of the content.

12. A device for processing digital images, comprising:
a baseline model neural network device including a baseline model neural network having a first feature extractor unit and a first classifier unit for classifying digital images adapted to determine, depending on a digital image, a first candidate class for content of the digital image; a prototypical neural network device including a prototypical neural network having a second feature extractor unit and a second classifier unit for classifying digital images adapted to determine a second candidate class for the content of the digital image; an aggregation device adapted to classify the content of the digital image into either the first candidate class or the second candidate class depending on the result of a comparison of a first confidence score for the first candidate class to a threshold or of a comparison of a first confidence score for the first candidate class to a second confidence score for the second candidate class; and a digital image transformation device adapted to apply one or more transformations to the digital image to create a modified digital image, the one or more transformations including: cropping, and/ or mirroring, and/or rotating, and/or smoothing, and/or contrast reduction, to create a modified digital image, the first candidate class and/or the second candidate class being determined for the modified digital image; wherein the aggregation device is adapted to determine an average of a numerical representation of the first and second candidate classes for the digital image and the modified digital image, the class for the content of the digital image being determined depending on the average; and wherein the one or more transformations are to make the baseline model neural network and/or the prototypical neural network more robust when the baseline model neural network and/or the prototypical neural network is trained with partial information or distorted information of training images.

13. A non-transitory computer-readable memory medium on which is stored a computer program digital for image content recognition, the computer program, when executed by a computer, causing the computer to perform the following steps: determining, depending on a digital image, a first candidate class for content of the digital image, by a baseline model neural network, the baseline model neural network including a first feature extractor and a first classifier for classifying digital images; determining a second candidate class for the content of the digital image by a prototypical neural network, the prototypical neural network including a second feature extractor and a second classifier for classifying digital images; and classifying the content of the digital image into either the first candidate class or the second candidate class depending on the result of a comparison of a first confidence score for the first candidate class to a threshold or of a comparison of a first confidence score for the first candidate class to a second confidence score for the second candidate class; and wherein the computer program, when executed by the computer, causing the computer to further perform the following steps: applying one or more transformations to the digital image to create a modified digital image, the one or more transformations including cropping and/or mirroring and/or rotating and/or smoothing and/or contrast reduction; determining the first candidate class and/or the second candidate class for the modified digital image; determining an average of a numerical representation of the first and second candidate classes for the digital image and the modified digital image; and determining a class for the content of the digital image depending on the average; and wherein the one or more transformations are to make the baseline model neural network and/or the prototypical neural network more robust when the baseline model neural network and/or the prototypical neural network is trained with partial information or distorted information of training images.

14. A non-transitory computer-readable memory medium on which is stored a computer program digital for training an artificial neural network for image content recognition, the computer program, when executed by a computer, causing the computer to perform: collecting a first set of digital images from a database, the database including digital images assigned to many shot classes and digital images assigned to few shot classes, wherein the first set of digital images is sampled from the digital images assigned to a many shot class; creating a first training set including the collected first set of digital images; training, in a first stage, a first artificial neural network, the first artificial neural network including a first feature extractor and a first classifier for classifying digital images using the first training set; collecting first parameters of the first feature extractor of the trained first artificial neural network; and determining, in a second stage, second parameters of a second feature extractor of a second artificial neural network, the second artificial neural network including the second feature extractor and a second classifier for classifying digital images depending on the first parameters; wherein, digital images assigned to a class are sampled for the first set of digital images when the number of digital images assigned to the class exceeds a first threshold, wherein the digital images assigned to the class are sampled fora second set of digital images when the number of digital images assigned to the class exceeds a second threshold, and wherein digital images assigned to the class are neither sampled for the first set of digital images nor for the second set of digital images, when the number of digital images assigned to the class is equal to or below the first threshold and the second threshold.

* * * * *

UNITED STATES PATENT AND TRADEMARK OFFICE
CERTIFICATE OF CORRECTION

| | | |
|---|---|---|
| PATENT NO. | : 11,263,495 B2 | Page 1 of 1 |
| APPLICATION NO. | : 16/880339 | |
| DATED | : March 1, 2022 | |
| INVENTOR(S) | : Nicole Ying Finnie and Benedikt Sebastian Staffler | |

It is certified that error appears in the above-identified patent and that said Letters Patent is hereby corrected as shown below:

On the Title Page

In Item (30) Foreign Application Data, replace:
"19177832"
With:
--19177832.3--

Signed and Sealed this
Tenth Day of May, 2022

Katherine Kelly Vidal
*Director of the United States Patent and Trademark Office*